(12) United States Patent
Furukawa

(10) Patent No.: US 10,030,612 B2
(45) Date of Patent: Jul. 24, 2018

(54) FUEL-INJECTION SYSTEM

(71) Applicant: DENSO CORPORATION, Kariya, Aichi-pref. (JP)

(72) Inventor: Takashi Furukawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 3 days.

(21) Appl. No.: 15/022,230

(22) PCT Filed: Sep. 1, 2014

(86) PCT No.: PCT/JP2014/004467
§ 371 (c)(1),
(2) Date: Mar. 16, 2016

(87) PCT Pub. No.: WO2015/045277
PCT Pub. Date: Apr. 2, 2015

(65) Prior Publication Data
US 2016/0237955 A1 Aug. 18, 2016

(30) Foreign Application Priority Data

Sep. 25, 2013 (JP) ................................. 2013-198622

(51) Int. Cl.
*F02M 21/02* (2006.01)
*F02M 35/10* (2006.01)
*F02M 35/104* (2006.01)

(52) U.S. Cl.
CPC .... *F02M 21/0278* (2013.01); *F02M 21/0221* (2013.01); *F02M 21/0239* (2013.01);
(Continued)

(58) Field of Classification Search
CPC ............. F02D 41/0025; F02D 41/3094; F02D 41/402; F02D 41/0027; F02D 19/0642;
(Continued)

(56) References Cited

U.S. PATENT DOCUMENTS 5,329,760 A * 7/1994 Bradley ................. F02B 77/04
60/779
5,758,618 A * 6/1998 Jay ......................... F02B 47/02
123/25 C
(Continued)

FOREIGN PATENT DOCUMENTS

JP H04-024659 2/1992
JP H06-117342 4/1994
(Continued)

OTHER PUBLICATIONS

International Search Report and Written Opinion for PCT/JP2014/004467 dated Nov. 4, 2014, 16 pages.

*Primary Examiner* — Long T Tran
(74) *Attorney, Agent, or Firm* — Nixon & Vanderhye P.C.

(57) ABSTRACT

A fuel injection system includes a first injection valve, a second injection valve, a communication pipe, and an ECU. The communication pipe makes a second passage of the second injection valve and a back pressure chamber of the first injection valve communicate with each other. The ECU controls an electric actuator of the second injection valve so as to switch first injection control and second injection control according to the required injection amount. In the first injection control, a second valve body is opened for a predetermined time or more so that back pressure lowers to the pressure of opening a first valve body. In the second injection control, the second valve body is opened for less than the predetermined time so that the back pressure does not lower to the pressure of opening the first valve body.

7 Claims, 10 Drawing Sheets

(52) U.S. Cl.
CPC .... *F02M 21/0254* (2013.01); *F02M 21/0263* (2013.01); *F02M 21/0284* (2013.01); *F02M 35/10216* (2013.01); *F02M 21/0215* (2013.01); *F02M 35/104* (2013.01); *Y02T 10/32* (2013.01)

(58) Field of Classification Search
CPC ............ F02D 19/0686; F02M 21/0215; F02M 2200/40; F02M 35/10216; F02M 21/02; F02M 21/0254
See application file for complete search history.

(56) References Cited

U.S. PATENT DOCUMENTS

| | | | |
|---|---|---|---|
| 6,691,649 B2* | 2/2004 | Zauner | F02B 25/14 123/73 B |
| 7,556,017 B2* | 7/2009 | Gibson | F02M 45/086 123/299 |
| 2007/0246561 A1* | 10/2007 | Gibson | F02M 45/086 239/5 |
| 2010/0095920 A1 | 4/2010 | Morishima | |
| 2013/0095398 A1 | 4/2013 | Kato et al. | |
| 2013/0139790 A1 | 6/2013 | Park et al. | |
| 2013/0247875 A1* | 9/2013 | Jay | F02M 43/04 123/447 |

FOREIGN PATENT DOCUMENTS

| | | |
|---|---|---|
| JP | H06-123263 | 5/1994 |
| JP | 2002-231277 | 8/2002 |
| JP | 2004-197625 | 7/2004 |
| JP | 2013-019527 | 1/2013 |

\* cited by examiner

FUEL-INJECTION SYSTEM

CROSS REFERENCE TO RELATED APPLICATIONS

This application is the U.S. national phase of International Application No. PCT/JP2014/004467 filed Sep. 1, 2014 which designated the U.S. and claims priority to Japanese Patent Application No. 2013-198622 filed Sep. 25, 2013, the entire contents of each of which are hereby incorporated by reference.

TECHNICAL FIELD

The present disclosure relates to a fuel injection system for a gas fuel used for supplying fuel to an internal combustion engine or a fuel cell, for example.

BACKGROUND ART

When fuel is gas, the dynamic range of the required injection amount is large compared to the case of liquid. Therefore, when a large injection valve that can inject the maximum value of the presumed required injection amount within a predetermined time is used as an injection valve injecting a gas fuel, the injection amount cannot be controlled precisely when the required injection amount is small.

Therefore, the fuel injection system described in Patent Literature 1 includes two injection valves of a small injection valve of a low flow rate type and a large injection valve of a high flow rate type. Also, by controlling the electric actuators provided in the respective injection valves as described below, control from a large injection amount to a small injection amount is allowed. More specifically, in the range of a small required injection amount, the injection amount is controlled by flow rate control by the small injection valve while the large injection valve is totally closed. Also, in the range of a large required injection amount, the injection amount is controlled by flow rate control by the large injection valve while the small injection valve is totally opened.

However, according to the above system described in Patent Literature 1, electronic control of the operation of the electric actuators is required for each of the two injection valves. Therefore, the control becomes complicated, and processing load of the control increases.

PRIOR ART LITERATURES

Patent Literature

Patent Literature 1 JP 2002-231277 A

SUMMARY OF INVENTION

It is an object of the present disclosure to provide a fuel injection system which simplifies the control and reduces the processing load of the control while the dynamic range of the fuel injection amount is enlarged.

The fuel injection system of the present disclosure includes a first injection valve that includes a first valve body that opens/closes a first injection hole that injects a gas fuel and a first body in which a back pressure chamber is formed, the back pressure chamber making the pressure of the gas fuel act on the first valve body as a valve closing force, a second injection valve that includes a second valve body that opens/closes a second injection hole that injects the gas fuel, a second body in which a second passage is formed, the second passage making the gas fuel circulate to the second injection hole, and an electric actuator that makes a valve opening force act on the second valve body, a communication pipe that makes the second passage and the back pressure chamber communicate with each other, and a control portion that controls an energization state to the electric actuator and controls the operation of the second valve body.

The control portion switches first injection control of opening the second valve body for a predetermined time or more so that the pressure of the back pressure chamber lowers to the pressure of opening the first valve body and second injection control of opening the second valve body for less than the predetermined time so that the pressure of the back pressure chamber does not lower to the pressure of opening the first valve body according to a required injection amount.

With this configuration, because the second passage communicates with the back pressure chamber, when the second valve body is opened, accompanying that the fuel is injected from the second injection hole and the pressure of the second passage lowers, the pressure of the back pressure chamber can be lowered. Therefore, when the second valve body is opened and the pressure of the second passage is lowered to the pressure of opening the first valve body, both of the second valve body and the first valve body can be opened. Also, when the valve opening time of the second valve body is shortened, the pressure of the back pressure chamber does not lower sufficiently, and the first valve body does not open. In other words, the second valve body can be opened without opening the first valve body.

In view of these points, the first injection control of opening the second valve body for a predetermined time or more so as to open the first valve body and the second injection control of opening the second valve body for less than the predetermined time so as not to open the first valve body are switched according to the required injection amount. Therefore, only by controlling the electric actuator of the second injection valve without mounting an electric actuator on the first injection valve, the second injection of injection from the second injection valve only and the first injection of injection from both injection valves can be achieved. Accordingly, the accuracy of the injection amount at the time of the second injection can be improved even while the maximum possible injection amount is increased by the first injection of injection from the both injection valves.

Also, control of switching the second injection and the first injection and control of the injection amount at the time of the second injection and at the time of the first injection can be achieved only by control of one electric actuator. Therefore, the processing load of the control can be reduced compared to the case of arranging electric actuators in both of the injection valves respectively.

EMBODIMENTS FOR CARRYING OUT INVENTION

Figure 1:
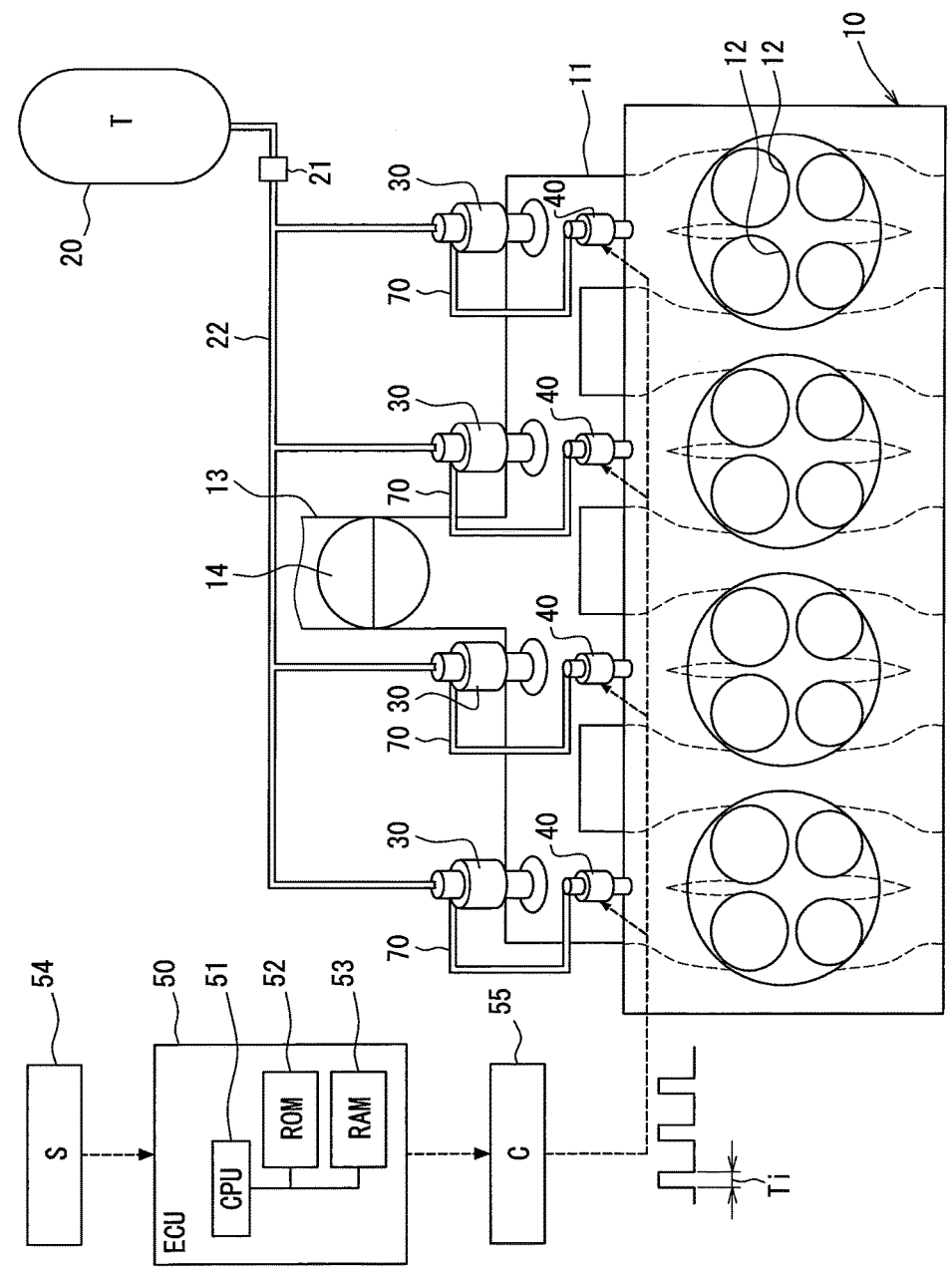
FIG. 1 is a schematic drawing showing a state a fuel injection system related to the first embodiment is mounted on a vehicle.

Below, a plurality of aspects for implementing the disclosure will be explained referring to the drawings. In each aspect, there is a case that a portion corresponding to the item explained in a preceding aspect is marked with a same reference sign and duplicated explanation is omitted. In the case only a part of the configuration is explained in each aspect, with respect to the other portion of the configuration, other aspect explained in advance can be applied. Not only the combination of portions explicitly shown to be capable of combining specifically in each embodiment but also the partial combination of the embodiments is possible even when it is not explicitly shown as far as the combination does not cause a problem particularly.

First Embodiment

As shown in FIG. 1, the fuel injection system related to the present embodiment supplies fuel to an internal combustion engine 10 mounted on a vehicle. The internal combustion engine 10 is an ignition type internal combustion engine and includes a plurality of cylinders. On the vehicle, a fuel tank 20 is mounted which stores the gas fuel in a compressed state. As the concrete examples of the gas fuel, compressed natural gas (CNG), liquefied natural gas (LNG), hydrogen, and the like can be cited.

The gas fuel within the fuel tank 20 is pressure-regulated by a pressure regulating valve 21. Thereafter, the gas fuel is distributed and supplied to first injection valves 30 disposed in respective cylinders by a distribution pipe 22. Further, the gas fuel is supplied to second injection valves 40 through the first injection valves 30. These first injection valves 30 and second injection valves 40 inject the supplied gas fuel into an intake manifold 11. The intake manifold 11 is equivalent to an intake pipe.

In the intake flow direction within the intake manifold 11, the second injection valve 40 is disposed on the downstream side of the first injection valve 30. More specifically, the first injection valve 30 and the second injection valve 40 are disposed so that a second injection hole 41a of the second injection valve 40 is positioned on the downstream side of the gas fuel that is injected from a first injection hole 31a of the first injection valve 30.

The intake manifold 11 is connected to an intake port 12 that is arranged in the combustion chamber of the internal combustion engine 10, and an intake valve 14 that adjusts the suction amount of the air is attached to an intake pipe 13 that is connected to the upstream side of the intake manifold 11. The suction air regulated by the intake valve 14 is mixed with the gas fuel in the intake manifold 11, and flows in to the combustion chamber from the intake port 12.

An ECU (Electronic Control Unit) 50 that is an electronic control device mounted on a vehicle includes a central processing device 51, a non-volatile memory 52, and a volatile memory 53. The ECU 50 functions as a control portion. The central processing device 51 executes the calculation process according to a program stored in the non-volatile memory 52. The ECU 50 controls the operation of a drive circuit 55 based on the detection values of various sensors 54 mounted on the vehicle. The drive circuit 55 supplies drive electric power to the electric actuator included in the second injection valve 40 according to the command signal from the ECU 50.

Thus, the fuel injection amount and the injection timing by the second injection valve 40 are controlled. Also, as described in detail below, the fuel injection amount and the injection timing by the first injection valve 30 are controlled by fuel injection by the second injection valve 40. Therefore, the ECU 50 controls the fuel injection amount from the first injection valve 30 and the second injection valve 40 and the injection timing by controlling the operation of the second injection valve 40. Below, the fuel injection amount by the second injection valve 40 is described as the second injection amount, and the fuel injection amount from the first injection valve 30 and the second injection valve 40 is described as the total injection amount Q.

The ECU 50 firstly acquires information such as the accelerator pedal operation amount by the vehicle operator and the output shaft rotation speed of the internal combustion engine 10 (engine speed) from the sensors 54. Next, based on the information, the injection amount of the fuel required in one combustion cycle of the internal combustion engine 10 (hereinafter described as a required injection amount Qreq) is calculated. Next, the time for supplying the drive electric power to the second injection valve 40 so that the total injection amount Q becomes the required injection amount Qreq (hereinafter described as a pulse width Ti) is calculated. Next, a command signal is outputted to the drive circuit 55 so as to supply the electric power with the calculated pulse width Ti.

Figure 2:
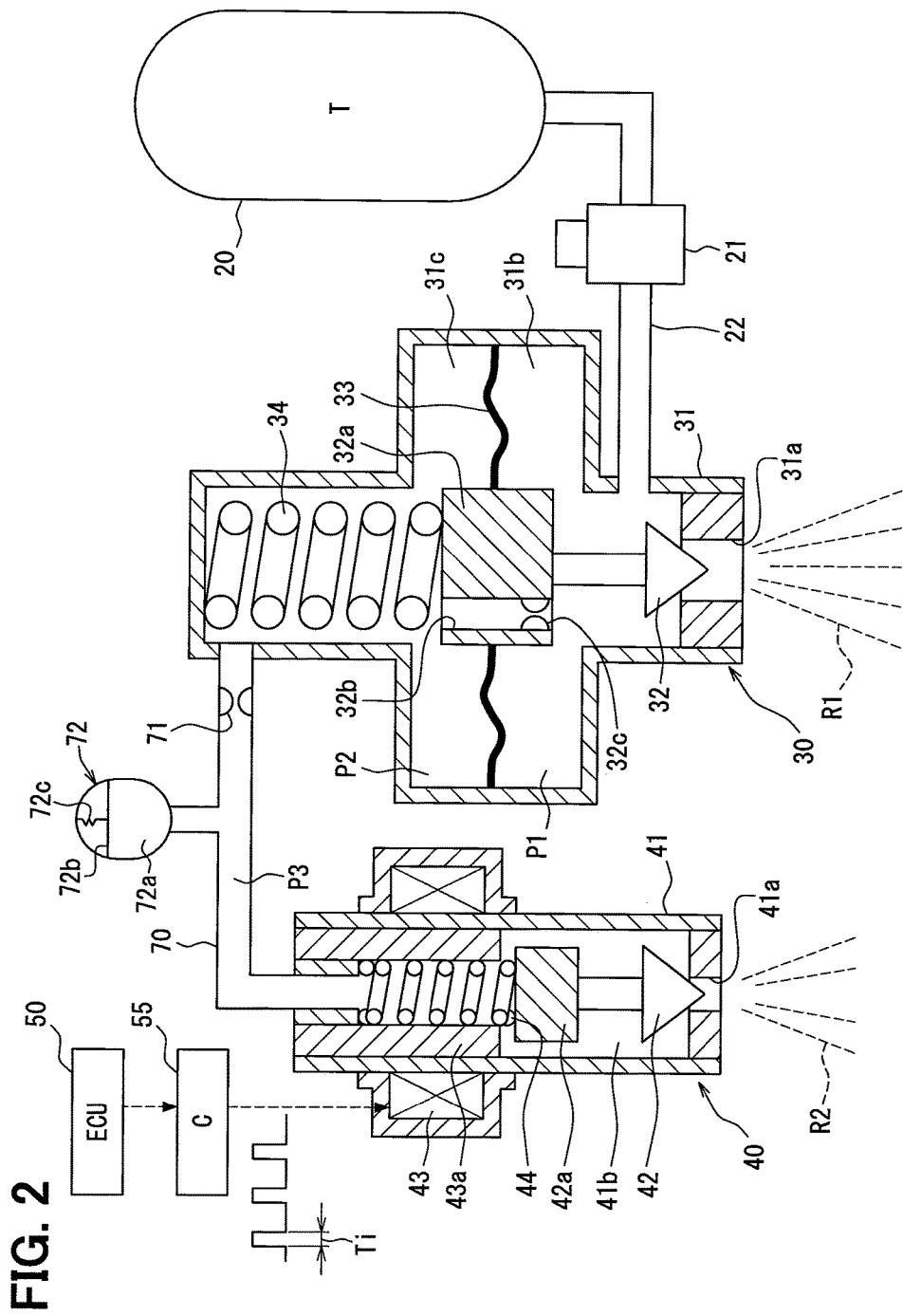
FIG. 2 is a schematic drawing showing an operation state of the time the fuel injection system related to the first embodiment injects the fuel.

As shown in FIG. 2, the first injection valve 30 includes a first body 31, a first valve body 32, a diaphragm 33, and a first spring 34. A circulation passage for the fuel supplied from the distribution pipe 22 is formed inside the first body 31, and the first injection hole 31a for injecting the gas fuel is formed at the distal end of the first body 31. The first valve body 32 is stored in the first body 31, and operates so as to open/close the first injection hole 31a. The diaphragm 33 is attached to the inside of the first body 31, and partitions the circulation passage to a first passage 31b and a back pressure chamber 31c. To the first passage 31b, the high pressure fuel that is pressure-regulated by the pressure regulating valve 21 is supplied through the distribution pipe 22.

A back surface section 32a of the first valve body 32 is attached to the diaphragm 33. Thus, the diaphragm 33 and the first valve body 32 operate in an integrated manner. The back surface section 32a faces both of the first passage 31b and the back pressure chamber 31c. The first spring 34 is disposed in the back pressure chamber 31c, and presses the first valve body 32 to the valve closing side by imparting the elastic force to the back surface section 32a.

In the back surface section 32a, an inner communication passage 32b that makes the first passage 31b and the back pressure chamber 31c communicate with each other is formed. In the inner communication passage 32b, a first orifice 32c is arranged. The first orifice 32c limits the flow rate so as to reduce the flow rate of the fuel that flows in from the first passage 31b to the back pressure chamber 31c, and is equivalent to the first flow rate limiting section.

The pressure of the fuel of the back pressure chamber 31c is imparted to one surface of the diaphragm 33, and the pressure of the fuel of the first passage 31b is imparted to the other surface. In other words, the combustion pressure of the first passage 31b is applied to the first valve body 32 as the valve opening force, and the combustion pressure of the back pressure chamber 31c and the elastic force of the first spring 34 are applied to the first valve body 32 as the valve closing force. In short, when the combustion pressure of the back pressure chamber 31c lowers, the pressure difference between the first passage 31b and the back pressure chamber 31c is increased. The valve opening force by the pressure difference becomes larger than the valve closing force by the first spring 34. Then, the first valve body 32 operates to open along with the diaphragm 33.

As shown in FIG. 2, the second injection valve 40 includes a second body 41, a second valve body 42, an electromagnetic coil 43, a second spring 44, a stationary core 43a, and a movable core 42a. Inside of the second body 41, a second passage 41b is formed which is the circulation passage of the fuel supplied from a communication pipe 70. At the distal end of the second body 41, the second injection hole 41a that injects the gas fuel is formed.

The second valve body 42 is stored inside the second body 41, and operates so as to open/close the second injection hole 41a. The movable core 42a is joined to the second valve body 42. The electromagnetic coil 43, the stationary core 43a, and the movable core 42a form the electric actuator, are attached to the second body 41, and form a magnetic circuit. When the electric power is supplied from the drive circuit 55 to the electromagnetic coil 43, a magnetic attracting force is generated, and the movable core 42a is attracted to the stationary core 43a.

In other words, the magnetic attracting force acts as a valve opening force that opens the second valve body 42. On the other hand, the elastic force of the second spring 44 acts as a valve closing force that closes the second valve body 42. Therefore, the second valve body 42 operates to open by the magnetic attracting force accompanying excitation-ON of the electromagnetic coil 43, and the second valve body 42 operates to close by the elastic force accompanying excitation-OFF of the electromagnetic coil 43.

The communication pipe 70 is connected to the first injection valve 30 and the second injection valve 40 so as to make the second passage 41b and the back pressure chamber 31c communicate with each other. Thus, the gas fuel inside the fuel tank 20 circulates through the distribution pipe 22, the first passage 31b, the back pressure chamber 31c, and the communication pipe 70 in this order, and is supplied to the second passage 41b of the second injection valve 40.

Inside of the communication pipe 70, a second orifice 71 is arranged. The second orifice 71 limits the flow rate so that the flow rate of the fuel that flows in from the back pressure chamber 31c to the second passage 41b reduces. The second orifice 71 is equivalent to the communication flow rate limiting portion. The degree the flow rate is reduced and limited by the second orifice 71 is set to be larger than the degree the flow rate is reduced and limited by the second injection hole 41a. In other words, the opening area of the second orifice 71 is set to be smaller than the opening area of the second injection hole 41a. Also, the degree the flow rate is reduced and limited by the first orifice 32c is set to be larger than the degree the flow rate is reduced and limited by the second orifice 71. In other words, the opening area of the first orifice 32c is set to be smaller than the opening area of the second orifice 71.

By these settings, the combustion pressure inside the first passage 31b (hereinafter described as the first combustion pressure P1), the combustion pressure inside the back pressure chamber 31c (hereinafter described as the back pressure Pm), and the combustion pressure inside the second passage 41b (hereinafter described as the second combustion pressure P2) come to change accompanying the delay of propagation. For example, when the fuel is injected from the second injection valve 40 and the second combustion pressure P2 lowers, the back pressure Pm also lowers. At this time, the second orifice 71 functions so as to delay the propagation of the combustion pressure drop so that the back pressure Pm starts to lower delayed from the time of start of drop of the second combustion pressure P2. Similarly, the first orifice 32c functions so as to delay the propagation of the combustion pressure drop so that the first combustion pressure P1 starts to lower delayed from the time of start of drop of the back pressure Pm.

To the communication pipe 70, an accumulator 72 is attached. The accumulator 72 has a reservoir 72a formed therein for reserving the fuel. The volume of the reservoir 72a is set to be larger compared to the volume of the inside of the communication pipe 70. The combustion pressure inside the reservoir 72a agrees to the combustion pressure inside the second passage 41b. The accumulator 72 includes a movable plate 72b and an elastic member 72c. The movable plate 72b moves according to the combustion pressure of the reservoir 72a, and changes the volume of the reservoir 72a. The elastic member 72c imparts an elastic force to the movable plate 72b in the direction of reducing the volume of the reservoir 72a.

Therefore, accompanying that the fuel is injected from the second injection valve 40 and the combustion pressure inside the second passage 41b lowers, the movable plate 72b moves, the volume of the reservoir 72a reduces, and the fuel inside the reservoir 72a comes to be supplied to the second passage 41b. Accordingly, the accumulator 72 functions so as to delay the rate of drop of the second combustion pressure P2 accompanying fuel injection by the second injection valve 40. In other words, the accumulator 72 functions so as to delay propagation of the combustion pressure drop similarly to the second orifice 71 so that the back pressure Pm starts to lower delayed from the time of start of drop of the second combustion pressure P2.

Because the second passage 41b communicates with the back pressure chamber 31c, when the second valve body 42 is opened, the back pressure Pm can be lowered accompanying that the fuel is injected from the second injection hole 41a and the second combustion pressure P2 lowers. Therefore, when the second valve body 42 is opened and the back pressure Pm is lowered to the pressure of opening the first valve body 32, both of the second valve body 42 and the first valve body 32 can be opened. Also, when the second valve body 42 is closed within a short time after opening, the back pressure Pm does not lower sufficiently, and the first valve body 32 does not open. In other words, the second valve body 42 can be opened without opening the first valve body 32.

In short, when the pulse width Ti is set to less than the predetermined value Ta (refer to FIG. 3) and the operation of the second injection valve 40 is controlled, the state of no-injection from the first injection valve 30 but injection from the second injection valve 40 (hereinafter described as the small injection) comes up. On the other hand, when the pulse width Ti is set to the predetermined value Ta or more and the operation of the second injection valve 40 is controlled, the state of injection from both of the first injection valve 30 and the second injection valve 40 (hereinafter described as the large injection) comes up. Therefore, in the characteristic drawing of FIG. 3, although the total injection amount Q increases as the pulse width Ti is increased, in the range the pulse width Ti is less than the predetermined value Ta, the increase rate of the total injection amount Q is smaller compared to the range of the predetermined value Ta or more. Also, the large injection described above is equivalent to the first injection, and the small injection described above is equivalent to the second injection.

In the non-volatile memory 52, a map (refer to FIG. 3) that expresses the value of the pulse width Ti corresponding to the total injection amount Q is stored. The ECU 50 calculates the pulse width Ti corresponding to the required injection amount Qreq based on the map described above, and outputs the command signal. Therefore, it can be said that the ECU 50 controls the pulse width Ti so as to switch between the predetermined value Ta or more and less than the predetermined value Ta according to the required injection amount Qreq.

Next, how the variation of the various pressure and the injection rate changes according to the pulse width Ti will be explained using FIG. 4-FIG. 6. Also, the injection rate described above means the amount injected per unit time, and, below, the injection rate from the first injection hole 31a will be described as the first injection rate R1, the injection rate from the second injection hole 41a will be described as the second injection rate R2, and the total of the both injection rates R1, R2 will be described as the total injection rate R.

Figure 4:
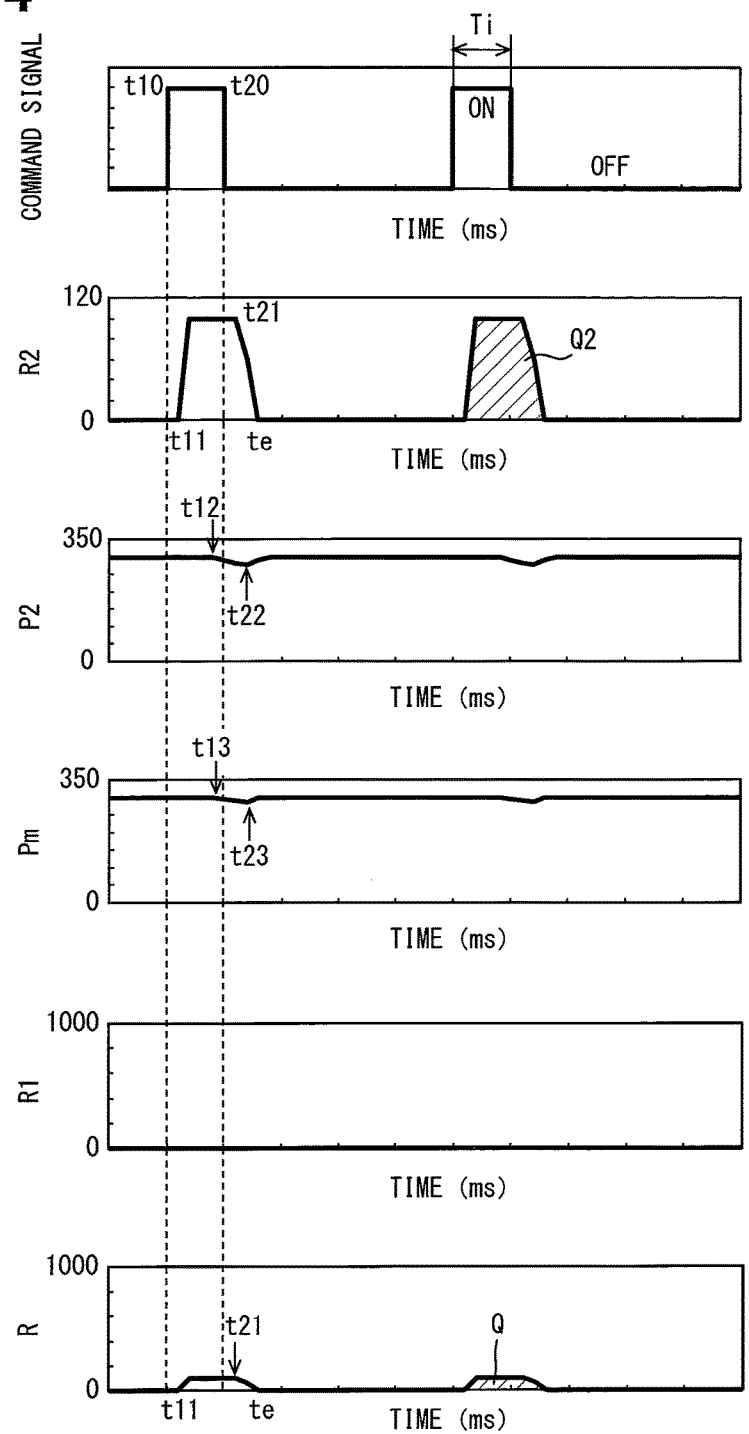
FIG. 4 is a time chart showing a mode of a case of small injection (second injection) in the first embodiment.

FIG. 4 shows a mode of a case the pulse width Ti is set to effect the small injection. When the pulse of the command signal is switched from OFF to ON at the time point t10, at the time point t11 when the magnetic attraction force by the electromagnetic coil 43 has sufficiently increased, the second valve body 42 starts the valve opening operation, and the second injection rate R2 starts to increase. Thereafter, the second combustion pressure P2 starts to lower at the time point t12, and, accompanying this drop, the back pressure Pm also starts to lower at the time point t13. As described above, the degree the flow rate is reduced and limited by the second orifice 71 is set to be larger than the degree the flow rate is reduced and limited by the second injection hole 41a. Therefore, the lowering rate of the back pressure Pm at the time point t13 and onward is slower than the lowering rate of the second combustion pressure P2 at the time point t12 and onward.

Thereafter, when the pulse of the command signal is switched from ON to OFF at the time point t20, the second valve body 42 starts the valve closing operation and the second injection rate starts to lower at the time point t21. Then, the degree of reduction by the second injection hole 41a gradually increases, and, at the time point t22 when the degree of reduction by the second injection hole 41a becomes larger than the degree of reduction by the second orifice 71, the second combustion pressure P2 starts to increase. Also, accompanying this increase, the back pressure Pm also starts to increase at the time point t23.

The back pressure Pm at this time point t23 has not lowered sufficiently to the degree of opening the first valve body 32. In other words, the pulse width Ti from the time point t10 to the time point t20 is less than the predetermined value Ta. Therefore, the first injection rate R1 does not increase, and the second injection rate R2 becomes zero at the time point "te". Accordingly, the total injection rate R agrees to the second injection rate R2. Also, the area marked with the oblique lines in the graph that expresses the total injection rate R is equivalent to the total injection amount Q.

Figure 5:
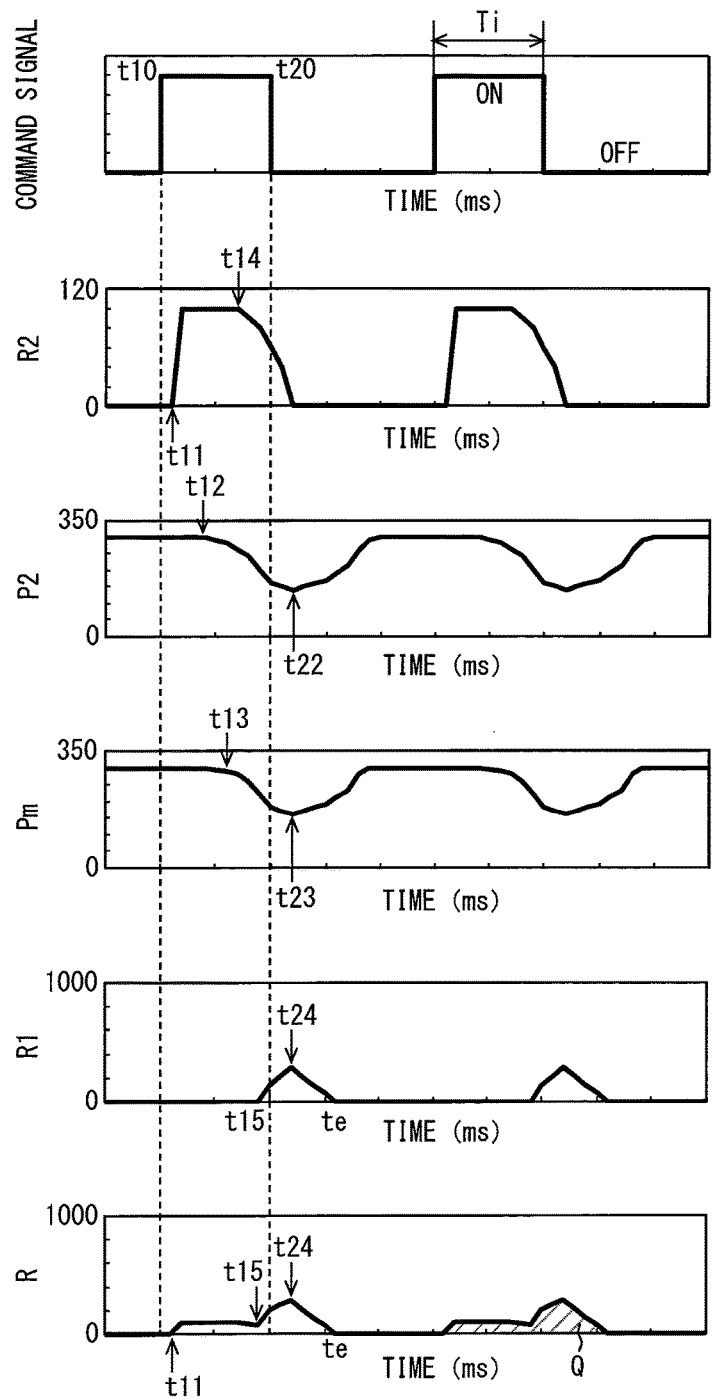
FIG. 5 is a time chart showing a mode of a case of large injection (first injection) in the first embodiment.

FIG. 5 shows a mode of a case the pulse width Ti is set to effect the large injection. When the pulse of the command signal is switched to ON at the time point of t10, at the time point t11 when the magnetic attraction force has sufficiently increased, the second valve body 42 starts the valve opening operation, and the second injection rate R2 starts to increase. Thereafter, at the time point t12, the second combustion pressure P2 starts to lower, and, accompanying this drop, the back pressure Pm also starts to lower at the time point t13.

Thereafter, at the time point t14 when the movable plate 72b of the accumulator 72 has moved to the lower limit position namely the position where the volume of the reservoir 72a is minimized, the second injection rate R2 starts to lower. Then, at the time point t15 when the back pressure Pm has lowered sufficiently to the degree of opening the first valve body 32, the first valve body 32 starts the valve opening operation, and the first injection rate R1 starts to increase.

Thereafter, when the pulse of the command signal is switched to OFF at the time point t20, the second valve body 42 starts the valve closing operation. In the example of FIG. 4, the pulse is switched to OFF in a state the second injection rate R2 has saturated at the maximum value. The maximum value described above is the value derived from the degree of reduction of the second injection hole 41a. On the other hand, in the example of FIG. 5, the pulse is switched to OFF in the midst of drop of the second injection rate R2. Thereafter, at the time point t22 when the degree of reduction by the second injection hole 41a becomes larger than the degree of reduction by the second orifice 71, the second combustion pressure P2 starts to increase. Also, accompanying this increase, the back pressure Pm also starts to increase at the time point t23. Further, at the time point t24 when the back pressure Pm has increased to the degree opening of the first valve body 32 cannot be maintained, the first valve body 32 starts the valve closing operation, and the first injection rate R1 starts to lower.

The pulse width Ti from the time point t10 to the time point t20 in FIG. 5 is the predetermined value Ta or more. Therefore, the first injection rate R1 also increases delayed from increase of the second injection rate R2, the first injection rate R1 also lowers delayed from drop of the second injection rate R2, and the first valve body 32 also closes at the time point "te" which is after the second valve body 42 closes. Therefore, the start of increase of the total injection rate R coincides with the start of increase of the second injection rate R2, and the start of drop of the total injection rate R coincides with the start of drop of the first injection rate R1. Also, at the time point "te" when the first injection rate R1 has become zero, the total injection rate R also becomes zero. Further, the area marked with the oblique lines in the graph that expresses the total injection rate R is equivalent to the total injection amount Q.

Figure 6:
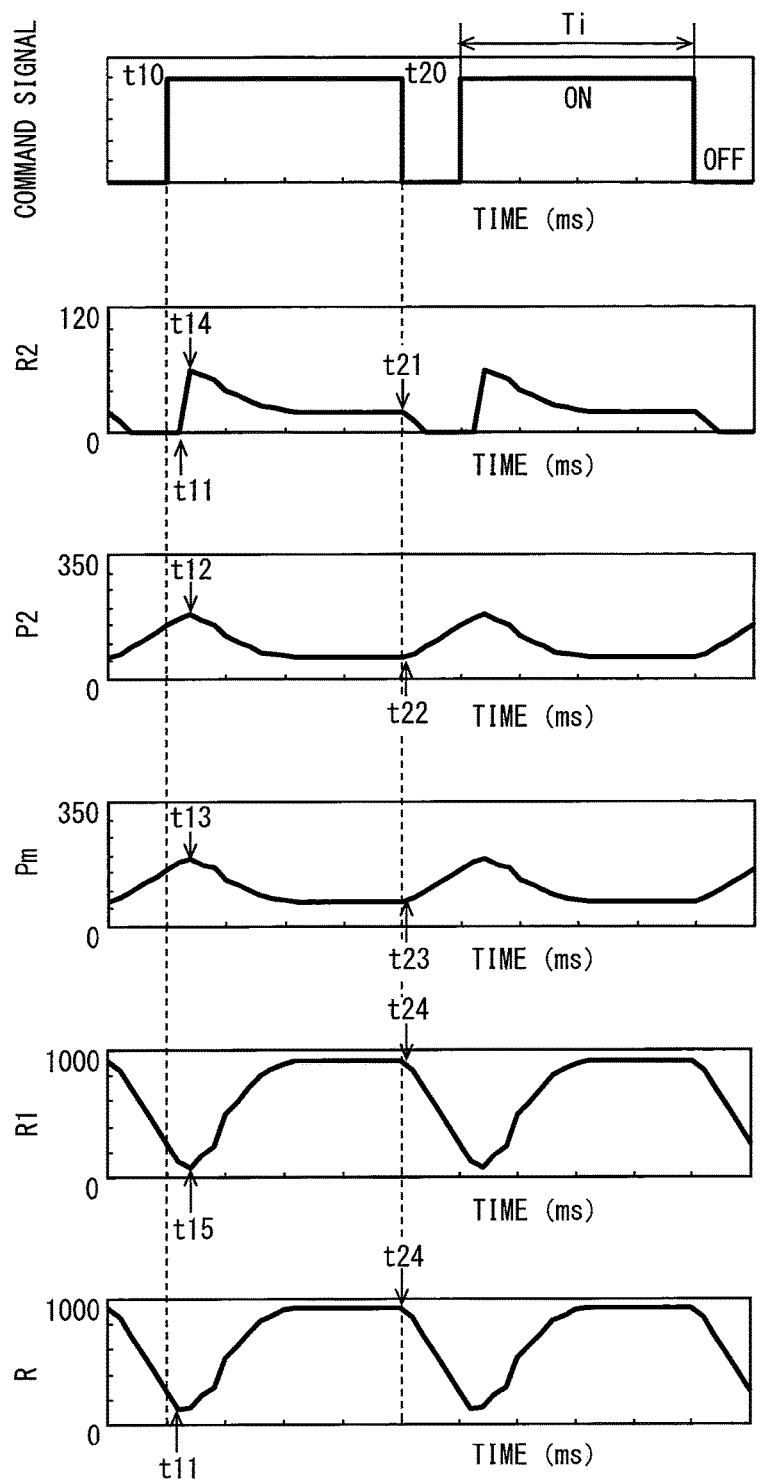
FIG. 6 is a time chart showing a mode of a case of large injection (first injection) in the first embodiment.

FIG. 6 is a mode of a case the pulse width Ti is set to effect the large injection, and shows an example of a case the pulse width Ti is made longer than that in the case of FIG. 5. When the pulse of the command signal is switched to ON at the time point of t10, at the time point t11 when the magnetic attraction force has sufficiently increased, the second valve body 42 starts the valve opening operation, and the second injection rate R2 starts to increase. Thereafter, the second combustion pressure P2 starts to lower at the time point t12, and, accompanying this drop, the back pressure Pm also starts to lower at the time point t13.

Thereafter, at the time point t14 when the movable plate 72b of the accumulator 72 has moved to the lower limit position, the second injection rate R2 starts to lower. Then, at the time point t15 when the back pressure Pm has lowered sufficiently, the first valve body 32 starts the valve opening operation, and the first injection rate R1 starts to increase.

Thereafter, by that the state of the pulse-ON is continued, each of the second injection rate R2, the second combustion pressure P2, the back pressure Pm, and the first injection rate R1 become the state of saturating at a constant value. Also, in the midst of such a saturating state, the pulse of the command signal is switched to OFF at the time point t20, the second valve body 42 starts the valve closing operation, and the second injection rate R2 starts to lower. Then, the degree of reduction by the second injection hole 41a gradually increases, and, at the time point t22 when the degree of reduction by the second injection hole 41a becomes larger than the degree of reduction by the second orifice 71, the second combustion pressure P2 starts to increase. Also, accompanying this increase, the back pressure Pm also starts to increase at the time point t23. Further, at the time point t24 when the back pressure Pm has increased to the degree opening of the first valve body 32 cannot be maintained, the first valve body 32 starts the valve closing operation, and the first injection rate R1 starts to lower.

In the example of FIG. 6, in the midst of drop of the first injection rate R1, next injection command is effected, and the pulse is switched to ON. Therefore, at the time point t10 of pulse-ON, the second injection rate R2 has become zero, but the first injection rate R1 has not become zero. Therefore, fuel injection from the second injection valve 40 is interrupted at every pulse-ON, whereas the fuel is injected from the first injection valve 30 without interruption.

In the fuel injection system of the present embodiment explained above, the actions and effects explained below are exerted.

The fuel injection system related to the present embodiment includes the first injection valve 30 that includes the back pressure chamber 31c, the second injection valve 40 that includes the second passage 41b and the electric actuator, and the communication pipe 70 that makes the second passage 41b and the back pressure chamber 31c communicate with each other. Also, the ECU 50 that controls the electric actuator switches the large injection control and the small injection control according to the required injection amount. The large injection control is the control of opening the second valve body 42 for a predetermined time or more so that the back pressure Pm lowers to the pressure of opening the first valve body 32. The small injection control is the control of opening the second valve body 42 for less than a predetermined time so that the back pressure Pm does not lower to the pressure of opening the first valve body 32.

Therefore, only by controlling the electric actuator of the second injection valve 40 without mounting the electric actuator on the first injection valve 30, the small injection of injection from the second injection valve 40 only and the large injection of injection from the both injection valves 30, 40 can be achieved. Accordingly, the accuracy of the injection amount at the time of the small injection can be improved by setting the area of the second injection hole 41a smaller than the area of the first injection hole 31a even while the dynamic range is increased. Also, control of switching the small injection and the large injection and control of the injection amount at the time of the small injection and at the time of the large injection can be achieved only by control of one electric actuator. Therefore, the processing load of the control by the ECU 50 can be reduced compared to the case of arranging the electric actuators in each of the both injection valves 30, 40.

Figure 7:
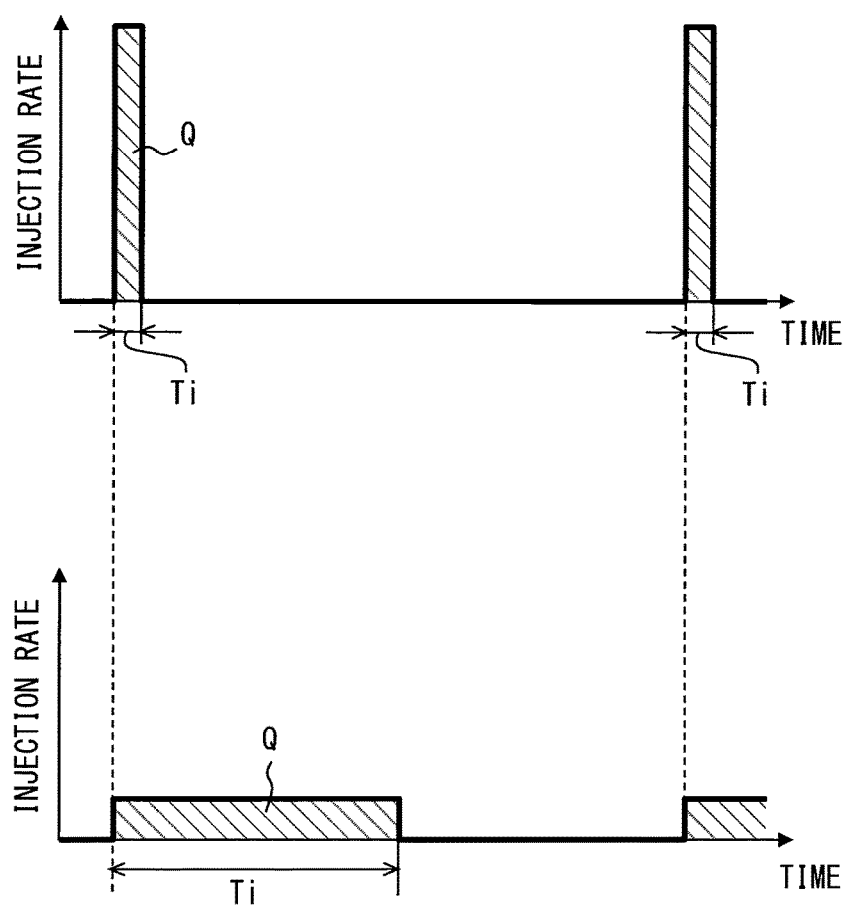
FIG. 7 is a drawing showing the temporal change of the fuel flow rate to the intake manifold, the upper part is a drawing by a fuel injection system as a comparative example of the first embodiment, and the lower part is a drawing by a fuel injection system related to the first embodiment.

Here, when a large dynamic range is to be secured with one injection valve in contradiction to the present embodiment, because the injection hole area has to be enlarged, in a case the required injection amount Qreq is less, the pulse width Ti becomes small (refer to FIG. 7). As a result, a large combustion pressure pulsation comes to occur on the downstream side of the injection hole.

On the other hand, according to the present embodiment, the dynamic range of the total injection rate R can be increased. In other words, even while the maximum value of the total injection rate R is increased, the minimum value can be made small. Therefore, even when the required injection amount Qreq is small, the pulse width Ti can be made long (refer to FIG. 7). Accordingly, the combustion pressure pulsation that occurs on the downstream side of the second injection hole 41a at the time of the small injection can be reduced.

The fuel injection system related to the present embodiment includes the accumulator 72 that reserves the gas fuel that is supplied to the second injection valve 40 through the communication pipe 70.

According to it, when the second valve body 42 is opened, because the fuel having been reserved in the accumulator 72 is supplied to the second passage 41b, drop of the second combustion pressure P2 is suppressed. Therefore, because drop of the back pressure Pm caused accompanying opening of the second valve body 42 is suppressed, the small injection of opening the second valve body 42 without opening the first valve body 32 can be positively achieved.

The fuel injection system related to the present embodiment includes the second orifice 71 namely the communication flow rate limiting section which limits the flow rate of the gas fuel that circulates through the communication pipe 70.

According to it, because the fuel flow from the back pressure chamber 31c to the second passage 41b is limited even when the second combustion pressure P2 lowers accompanying opening of the second valve body 42, drop of the back pressure Pm is suppressed. Therefore, the small injection of opening the second valve body 42 without opening the first valve body 32 can be positively achieved.

In the fuel injection system related to the present embodiment, the flow rate limiting amount at the second orifice 71 is set to be larger than the flow rate limiting amount at the second injection hole 41a.

According to it, because the flow rate of the fuel that flows from the back pressure chamber 31c to the second passage 41b becomes less than the flow rate injected from the second injection hole 41a in the valve opening state of the second valve body 42, suppression of drop of the back pressure Pm can be promoted. Therefore, the range of the pulse width Ti for the small injection out of the valve opening time of the second valve body 42 (namely the pulse width Ti) can be secured to be sufficiently large. In other words, the predetermined time Ta in FIG. 3 can be increased sufficiently.

The fuel injection system related to the present embodiment includes the first orifice 32c namely the first flow rate limiting means which limits the flow rate of the gas fuel that flows in from the first passage 31b to the back pressure chamber 31c. Also, the degree the flow rate is limited by the first orifice 32c is set to be larger than the degree the flow rate is limited by the second orifice 71.

According to it, because the flow rate of the fuel that flows from the first passage 31b to the back pressure chamber 31c becomes less than the flow rate flowing from the back pressure chamber 31c to the second passage 41b in the valve opening state of the first valve body 32, the lowered state of the back pressure Pm comes to be easily maintained. Therefore, the risk that the lowered state of the back pressure Pm cannot be maintained and the first valve body 32 is closed during the large injection can be reduced.

In the fuel injection system related to the present embodiment, the maximum injection rate by the second injection valve 40 is set to be smaller than the maximum injection rate by the first injection valve 30. Therefore, the effect of improving the accuracy of the injection amount and reducing the pressure pulsation by the small injection and the effect of increasing the dynamic range by the large injection can be promoted.

Here, when the fuel of the internal combustion engine 10 is gas, the mixing performance of the intake and the fuel is deteriorated compared to the case of the liquid. Therefore, it is desired to promote agitation of the intake and the fuel in the case of the gas fuel.

In view of this point, in the fuel injection system related to the present embodiment, the first injection valve 30 and the second injection valve 40 are disposed so that the second injection hole 41a is positioned on the downstream side of the first injection hole 31a in the intake flow direction in the intake manifold 11 (intake pipe).

Therefore, at the time of the large injection, because the fuel injected from the second injection hole 41a collides on the fuel injected from the first injection hole 31a, the flow of the fuel comes to be disturbed. Therefore, agitation of the intake and the fuel can be promoted.

Second Embodiment

Figure 8:
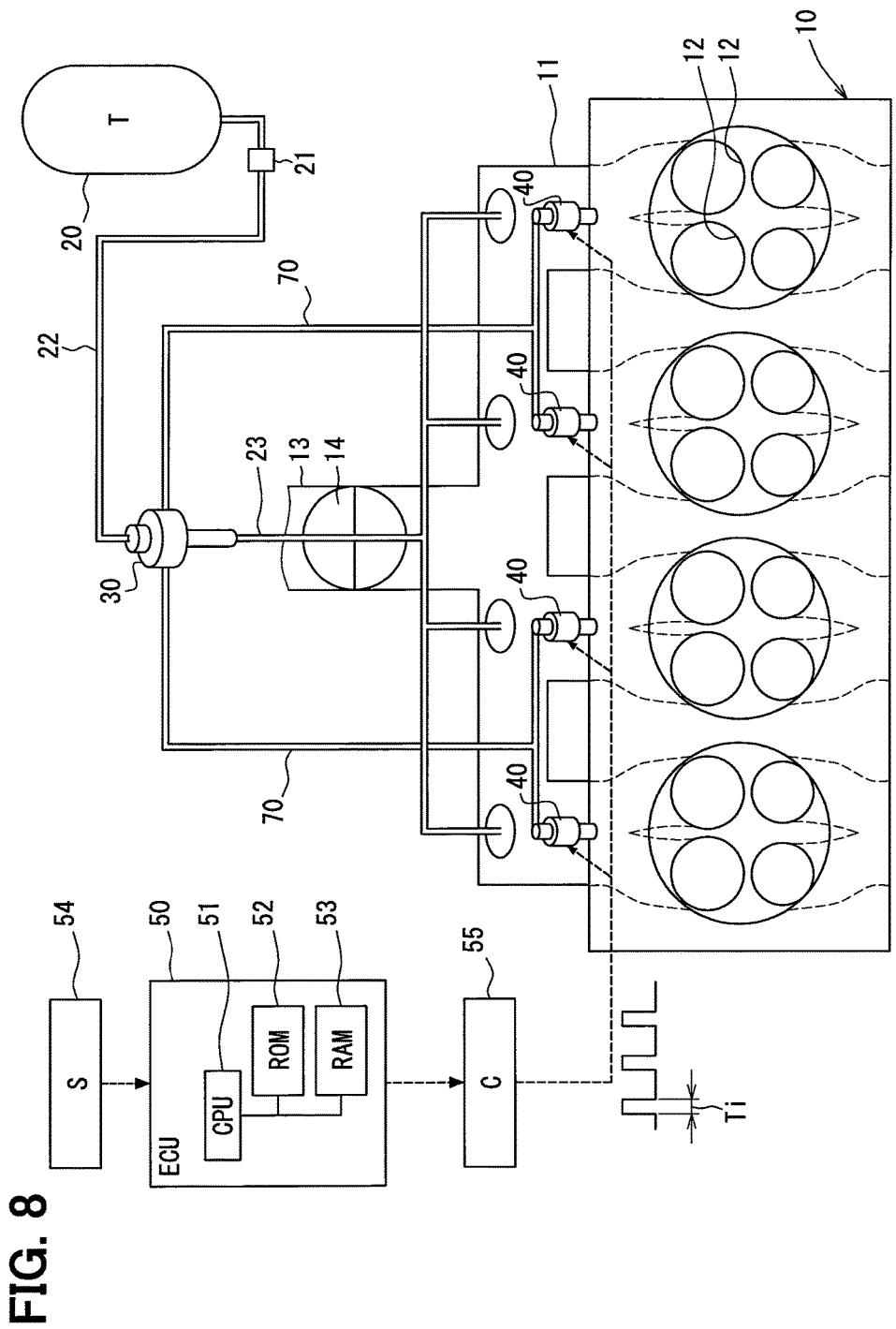
FIG. 8 is a schematic drawing showing a state a fuel injection system related to the second embodiment of the present invention is mounted on a vehicle.

In the first embodiment described above shown in FIG. 1, the first injection valve 30 is arranged in each of the cylinders. On the other hand, in the present embodiment shown in FIG. 8, one set of the first injection valve 30 is arranged for a plurality of cylinders. Also, the fuel injected from the first injection valve 30 is distributed and supplied to the portions of the intake manifold 11 corresponding to each cylinder by a distribution pipe 23. Also, the fuel of the back pressure chamber 31c of one set of the first injection valve 30 is distributed and supplied to the second injection valves 40 that are arranged in each of the cylinders by the communication pipes 70.

According to the present embodiment, in addition to that the actions and effects similar to those of the first embodiment described above are exerted, such an effect that the number of sets of the first injection valve 30 can be reduced is also exerted. However, according to the first embodiment in which the first injection valve is arranged in each of the cylinders, at the time of the large injection, the injection amount to each cylinder can be controlled with the higher accuracy compared to the present embodiment.

Third Embodiment

Figure 9:
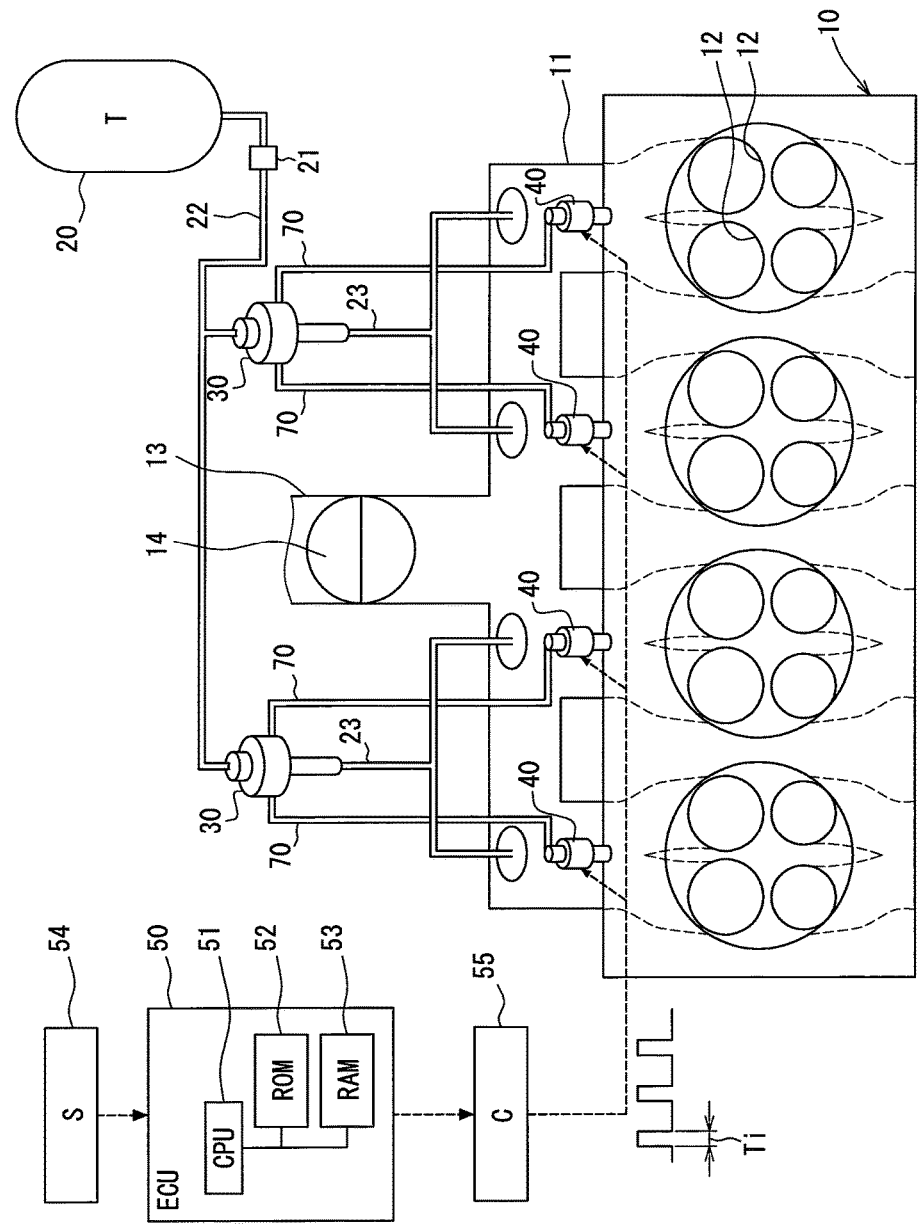
FIG. 9 is a schematic drawing showing a state a fuel injection system related to the third embodiment of the present invention is mounted on a vehicle.

In the second embodiment described above shown in FIG. 8, one set of the first injection valve 30 is arranged for a plurality of cylinders. On the other hand, in the present embodiment shown in FIG. 9, the first injection valve 30 is arranged by the numbers of 2 or more and less than the number of the cylinder. Also, the fuel injected from the first injection valves 30 is distributed and supplied to the portions corresponding to each cylinder out of the intake manifold 11 by the distribution pipes 23. Also, the fuel of the back pressure chamber 31c of the first injection valve 30 is distributed and supplied to the second injection valves 40 by the communication pipes 70. Thus, by the present embodiment also, the actions and effects similar to those of the second embodiment described above are exerted.

Fourth Embodiment

Figure 10:
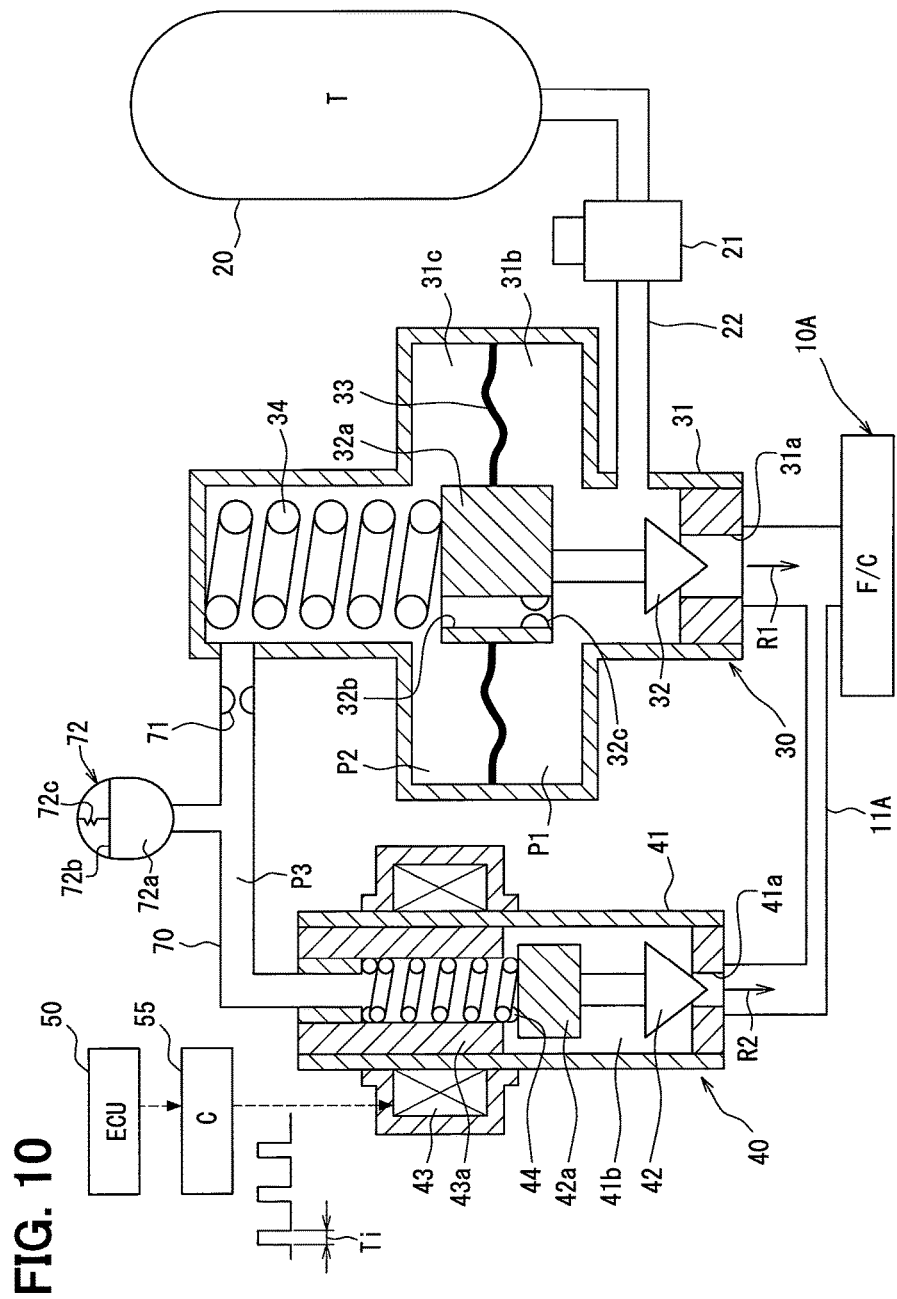
FIG. 10 is a schematic drawing showing a state a fuel injection system related to the fourth embodiment of the present invention is mounted on a vehicle.

The fuel injection system related to the respective embodiments described above is for supplying a gas fuel to the internal combustion engine 10. On the other hand, the fuel injection system related to the present embodiment supplies a gas fuel (hydrogen gas for example) to a cell stack included in a fuel cell 10A as shown in FIG. 10. In concrete terms, a supply pipe 11A is connected to the first injection hole 31a and the second injection hole 41a, and the hydrogen gas injected from the first injection hole 31a and the second injection hole 41a is supplied to the fuel cell 10A by the supply pipe 11A.

According to the present embodiment, the actions and effects similar to those of the first embodiment described above are exerted. Also, when a large combustion pressure pulsation is generated in the gas fuel supplied to the fuel cell 10A, deterioration of the fuel cell 10A is incurred. Therefore, such an effect of "the combustion pressure pulsation that occurs on the downstream side of the second injection hole 41a at the time of the small injection can be reduced" described above are exerted effectively.

Also, the required injection amount Qreq in the first embodiment meant the injection amount of the fuel required during one combustion cycle of the internal combustion engine 10, however, the required injection amount Qreq in the present embodiment means the injection amount required per the predetermined time.

Other Embodiment

The present invention is not limited to the described contents of the above embodiments, and may be changed and implemented as follows. Further, it is also possible to optionally combine the featuring configurations of each embodiment respectively.

Although the accumulator 72 shown in FIG. 2 includes the movable plate 72b and the elastic member 72c, an accumulator not including the movable plate 72b and the elastic member 72c may be employed.

When the volume of the accumulator 72 is sufficiently large, the second orifice 71 may be abolished. Also, when the degree of reduction by the second orifice 71 is sufficiently large, the accumulator 72 may be abolished.

Figure 3:
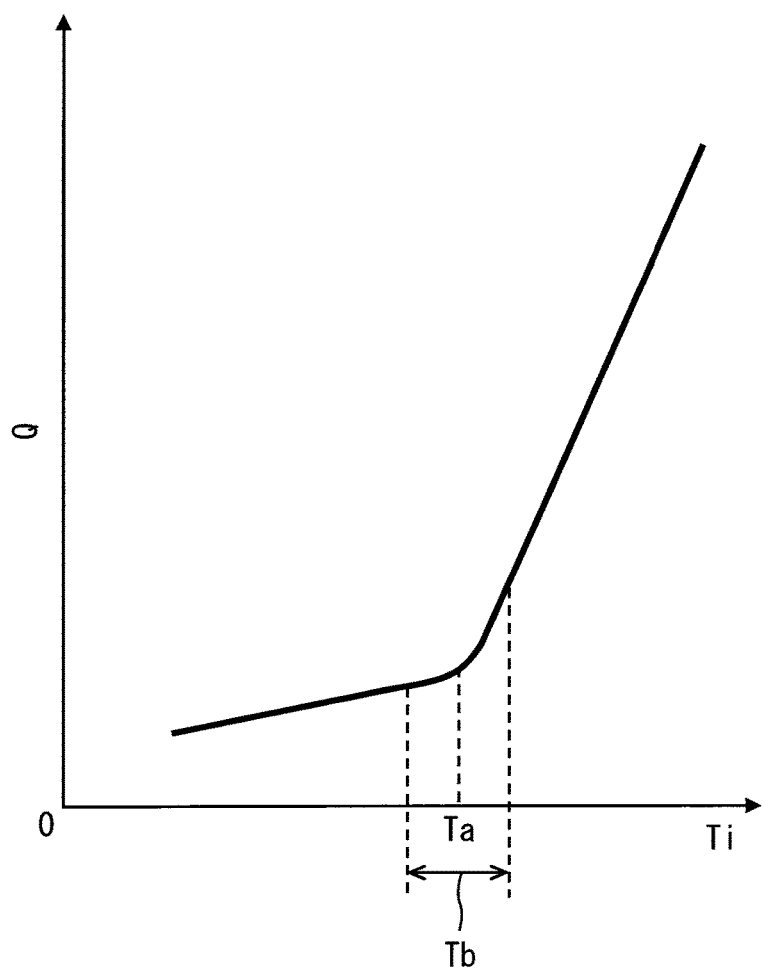
FIG. 3 is a characteristic drawing showing the relation between the total injection amount Q and the pulse width Ti in the first embodiment.

Here, when the pulse width Ti is set to a value near the predetermined value Ta out of the range of the pulse width Ti shown in FIG. 3, the surety of controlling so as to switch the large injection and the small injection deteriorates. In other words, when the pulse width Ti is set to a value slightly smaller than the predetermined value Ta, there is concern that the first valve body 32 opens and the big injection is effected. Also, when the pulse width Ti is set to a value slightly larger than the predetermined value Ta, there is concern that the first valve body 32 does not open and the small injection is effected.

Therefore, unintended injection state may be prevented by forbidding to set the pulse width Ti to a value of the range of the predetermined width Tb (refer to FIG. 3) including the predetermined value Ta. In this case, the excess and deficiency with respect to the required injection amount Qreq may be adjusted by the injection amount of the time of the next injection, or alternately, multistage injection of injection by a plurality of times in one combustion cycle may be executed.

The invention claimed is:

1. A fuel injection system, comprising:
    a first injection valve that includes a first valve body that opens/closes a first injection hole that injects a gas fuel and a first body in which a back pressure chamber is formed, the back pressure chamber making the pressure of the gas fuel act on the first valve body as a valve closing force;
    a second injection valve that includes a second valve body that opens/closes a second injection hole that injects the gas fuel, a second body in which a second passage is formed, the second passage making the gas fuel circulate to the second injection hole, and an electric actuator that makes a valve opening force act on the second valve body;
    a communication pipe that makes the second passage and the back pressure chamber communicate with each other; and
    a control unit that controls a pulse width supplied to the electric actuator of the second injection valve and controls the operation of the second valve body, wherein
    according to a required injection amount, the control unit switches:
    a first injection control in which the pulse width supplied to the electric actuator of the second injection valve is brought to be greater than or equal to a specified pulse width so that the pressure in the back pressure chamber is decreased to open the first injection valve, whereby both of the first injection valve and the second injection valve are opened, and
    a second injection control in which the pulse width supplied to the electric actuator of the second injection valve is brought to be less than the specified pulse width so that the pressure in the back pressure chamber is not decreased to open the first injection valve, whereby only the second injection valve is opened.

2. The fuel injection system according to claim 1, further comprising an accumulator that is arranged in the communication pipe and reserves a gas fuel that is supplied to the second injection valve through the communication pipe.

3. The fuel injection system according to claim 1, further comprising a communication flow rate limiting portion that limits the flow rate of the gas fuel that circulates through the communication pipe.

4. The fuel injection system according to claim 3, wherein the flow rate limited by the communication flow rate limiting section is set to be larger than the flow rate limited by the second injection hole.

5. The fuel injection system according to claim 4, wherein
    a first passage that is a passage that makes the gas fuel circulate to the first injection hole and communicates with the back pressure chamber is formed in the first body;
    a first flow rate limiting means is provided to limit the flow rate of the gas fuel that flows in from the first passage to the back pressure chamber; and
    the flow rate limited by the first flow rate limiting portion is set to be larger than the flow rate limited by the communication flow rate limiting portion.

6. The fuel injection system according to claim 1, wherein the maximum injection rate by the second injection valve is set to be smaller than the maximum injection rate by the first injection valve.

7. The fuel injection system according to claim 1, wherein
    the first injection valve and the second injection valve are attached to an intake pipe that makes intake flow in to the combustion chambers of an internal combustion engine; and
    the first injection valve and the second injection valve are disposed so that the second injection hole is positioned on the downstream side of the first injection hole in the intake flow direction in the intake pipe.

* * * * *